No. 682,546. Patented Sept. 10, 1901.
J. HAUSER.
CASH REGISTER.
(Application filed Jan. 23, 1899.)
(No Model.) 9 Sheets—Sheet 1.

Fig. 1.

No. 682,546. Patented Sept. 10, 1901.
J. HAUSER.
CASH REGISTER.
(Application filed Jan. 23, 1899.)
(No Model.) 9 Sheets—Sheet 3.

Fig. 3.

No. 682,546. Patented Sept. 10, 1901.
J. HAUSER.
CASH REGISTER.
(Application filed Jan. 23, 1899.)
(No Model.) 9 Sheets—Sheet 6.

Fig. 6.

No. 682,546. Patented Sept. 10, 1901.
J. HAUSER.
CASH REGISTER.
(Application filed Jan. 23, 1899.)
(No Model.) 9 Sheets—Sheet 7.

No. 682,546. Patented Sept. 10, 1901.
J. HAUSER.
CASH REGISTER.
(Application filed Jan. 23, 1899.)

(No Model.) 9 Sheets—Sheet 8.

Fig. 11.

Witnesses  
Inventor

No. 682,546. Patented Sept. 10, 1901.
J. HAUSER.
CASH REGISTER.
(Application filed Jan. 23, 1899.)
(No Model.) 9 Sheets—Sheet 9.

UNITED STATES PATENT OFFICE.

JOSEF HAUSER, OF FRANKFORT-ON-THE-MAIN, GERMANY, ASSIGNOR TO LOUIS DREYFUS, OF SAME PLACE.

CASH-REGISTER.

SPECIFICATION forming part of Letters Patent No. 682,546, dated September 10, 1901.

Application filed January 23, 1899. Serial No. 703,149. (No model.)

*To all whom it may concern:*

Be it known that I, JOSEF HAUSER, a subject of the Emperor of Germany, residing at Frankfort-on-the-Main, Germany, have invented certain new and useful Improvements in Cash-Registers, of which the following is a specification.

This invention relates to cash-registers of the kind wherein by the depression of keys provided with striking pieces or surfaces arranged at different heights shafts are rotated through angles of corresponding magnitude, which motion is transmitted by intermediate gearing to figure or numeral disks.

The invention relates to improvements in such cash-registers whereby the mechanism and the manipulation thereof are very considerably simplified and a better operation thereof is insured than heretofore.

The improvement relates, essentially, to the printing device, the connection of the printing device with the shafts set in partial rotation by the keys, the mechanism for actuating the printing device, and an arrangement for preventing the simultaneous depression of a tens and a units key.

In the accompanying drawings is shown a cash-register embodying the improvements forming the subject of the present invention, wherein—

Fig. 5 shows the keyboard in side elevation with the printing mechanism removed and illustrates the device for limiting the downward motion of the keys. Fig. $5^a$ is a detail plan view of a portion of the lower bar with its holes and guide-holders.

Figure 1:
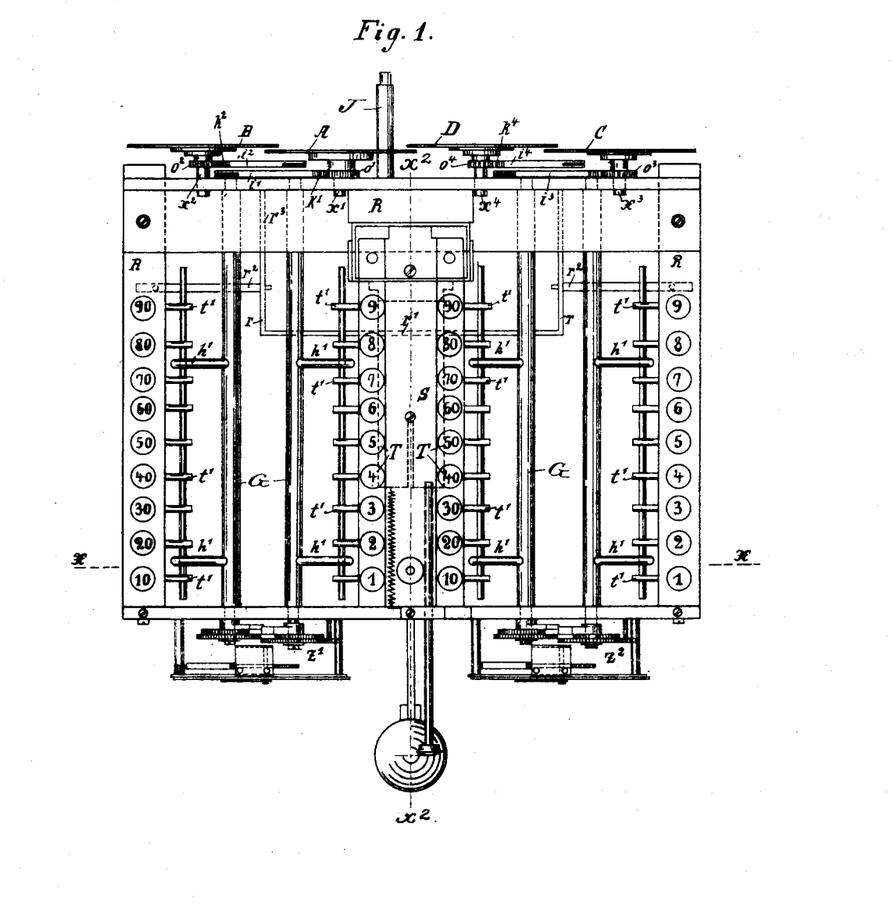
Figure 1 shows the said cash-register in plan with the printing mechanism removed.
Figure 3:
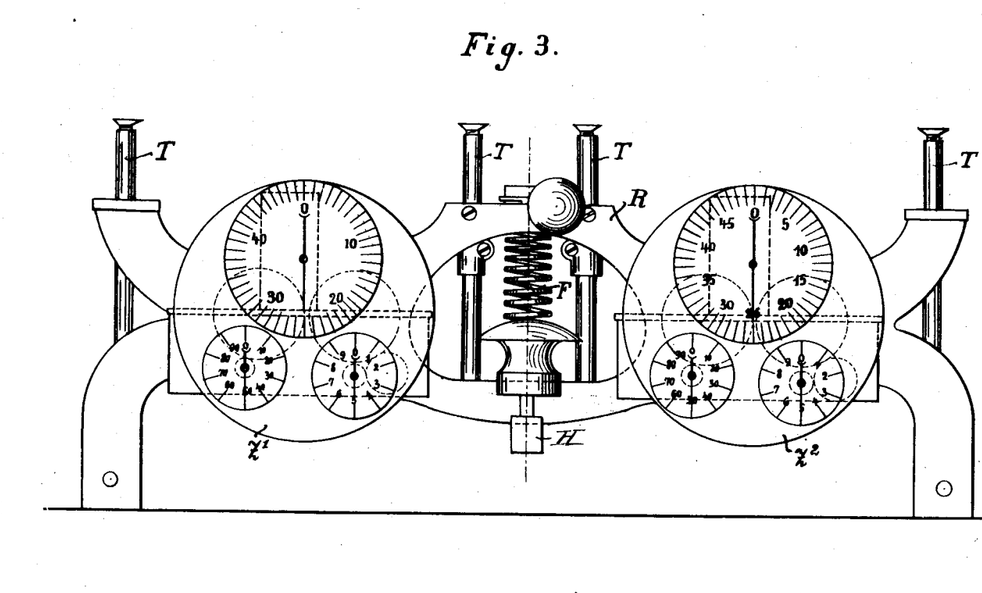
Fig. 3 is a front elevation of the register, showing the counting-train.
Figure 4:
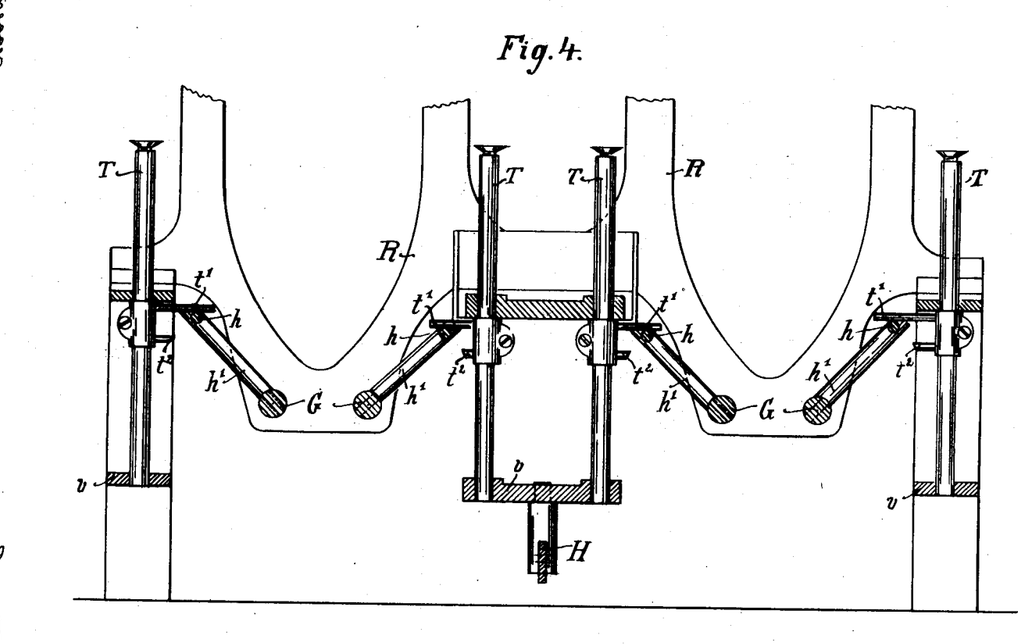
Fig. 4 is a vertical section on the line $x\ x$, Fig. 1.
Figures 5, 5A:
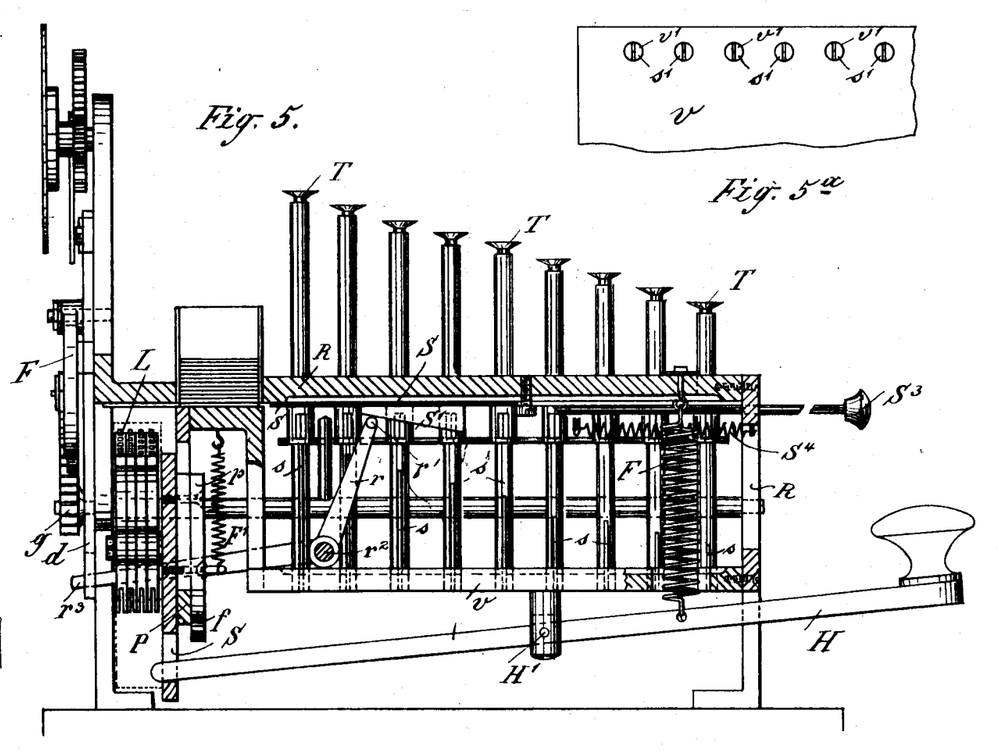

In the frame R of the cash-register are arranged four rows of keys T, Fig. 1. Each key T is provided with a vertical slot $s$, Fig. 5, the length of which is different in the several keys. In these slots are arranged guide-pieces or cross-bars $s'$, which are mounted in the guide-holders $v'$ in the lower bar $v$ of the frame R and on depression of the keys lie against the upper ends of the slots, so as to limit the downward motion of the said keys T. Each key T is, moreover, provided with two inwardly-projecting pins $t'$ and $t^2$, Fig. 4, of which the former rests on a longitudinal bar $h$, which is connected by arms $h'$ with a shaft G, pivotally mounted in the frame R. The four rows of keys are arranged so as to correspond, respectively, to four of these shafts G, Figs. 1 and 4. If a key T is depressed, the shaft G belonging thereto is simultaneously rotated. When the key reaches its lowermost position, the longitudinal bar $h$ rests on the second pin $t^2$, and the latter prevents further rotation of the shaft G from taking place on depression of another key. On the front end of the shafts G are arranged counting-trains $z'\ z^2$, Figs. 1 and 3, which add up all rotation of the shafts, and thus indicate the contents of the register. On the rear ends of the shafts G are mounted ratchet-wheel segments $G'\ G^2\ G^3\ G^4$, Fig. 2, with which engage detent levers or pawls $g'\ g^2\ g\ g^4$, which are acted on by springs $f^2$. On each ratchet-wheel segment $G'\ G^2\ G^3\ G^4$ is mounted a link $i'\ i^2\ i^3\ i^4$, which is secured at its other end to a spur-wheel segment $k'\ k^2\ k^3\ k^4$, mounted above in the frame R, Figs. 1 and 2, and thus transmits the motion of the said ratchet-wheel segments to the spur-wheel segment. The said spur-wheel segments $k'\ k^2\ k^3\ k^4$ engage with spur-wheels $o'\ o^2\ o^3\ o^4$, which are mounted on the shafts $x'\ x^2\ x^3\ x^4$, carrying the figure or numeral disks A B C D. If one of the shafts G be turned by depressing the key T, the numeral-disk A, for example, is set in rotation by means of the ratchet-wheel segment $G'$, lever-arm $i'$, the spur-wheel segment $k'$, and spur-wheel $o'$.

The detent lever or pawl $g'$ holds the whole mechanism fast in its new position. The release of this mechanism is effected by means of the ends $r^3$ of the rods $r$, the former engaging in the slide $d$ and lowering it, elevating by such movement the arms of the lever F, carried by the slide $d$, causing thereby the stop-pins $a$ upon the arms of the lever F to engage the upper arm of the detent levers or pawls, releasing the latter from their engagement with the ratchet-wheel segments. The rods $r$ are connected together by the transverse bar $r'$, the latter operated by means of the slide S, provided with the handle $S^2$. The slide S has formed on its underneath face the wedge $S'$, which engages the rod $r'$, so that the rods $r$ will be turned about their pivot or axis $r^2$.

In order to prevent a tens and a units key from being depressed simultaneously, which would cause a false indication of the counting-train, the following provision is made: Above each two ratchet-wheel segments $G'$ $G^2$ $G^3$ $G^4$ a double lever F is pivotally mounted on the vertically-movable slide $d$, the two arms of this lever extending over the double pawls $g'$ $g^2$ $g^3$ $g^4$ at such a distance that on turning the shafts G only one segment can turn at any time, since the pawl of the other segment is held in engagement with the segment by the lever F. Each arm of the lever F is provided with a stop-pin $a$, which in the upward motion of the said lever strikes against the second arm of the pawl $g'$ $g^2$ $g^3$ $g^4$ and brings the latter out of engagement with the segment. The upward motion of the lever F is effected by the ends $r^3$ of the rods $r$, which enter a slot in the slide $d$, carrying the double lever F.

Figure 2:
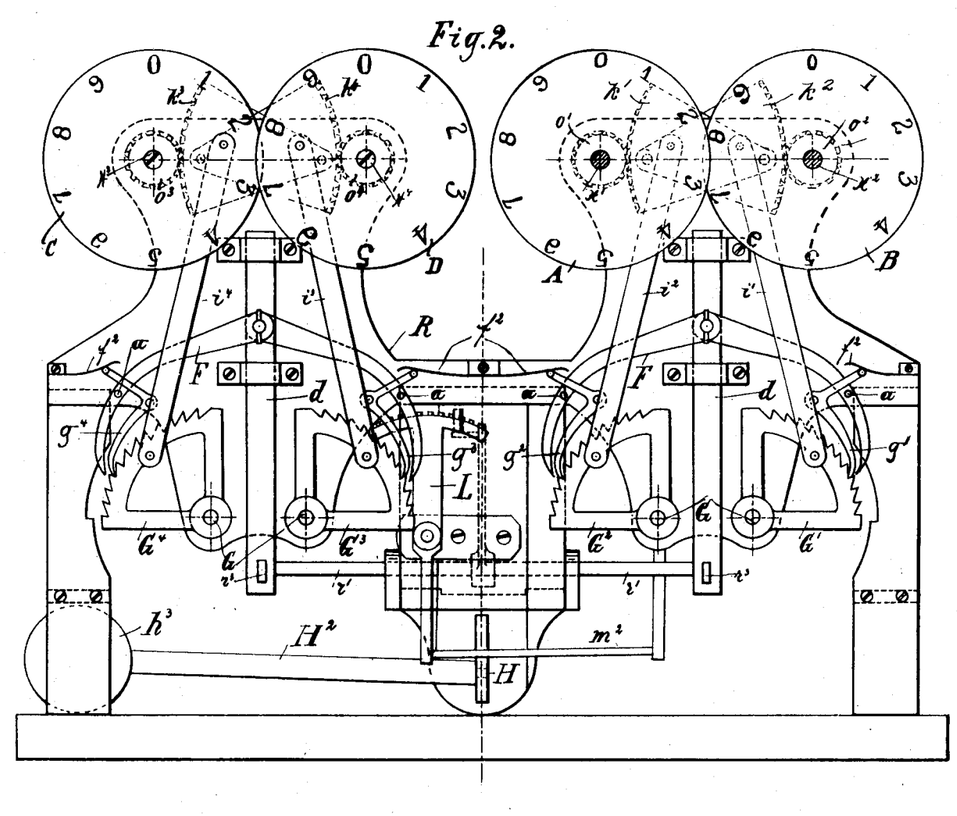
Fig. 2 is an end elevation illustrating the mechanism transmitting the partial rotations of the shafts actuated by the keys to the figure or numeral disks.
Figure 6:
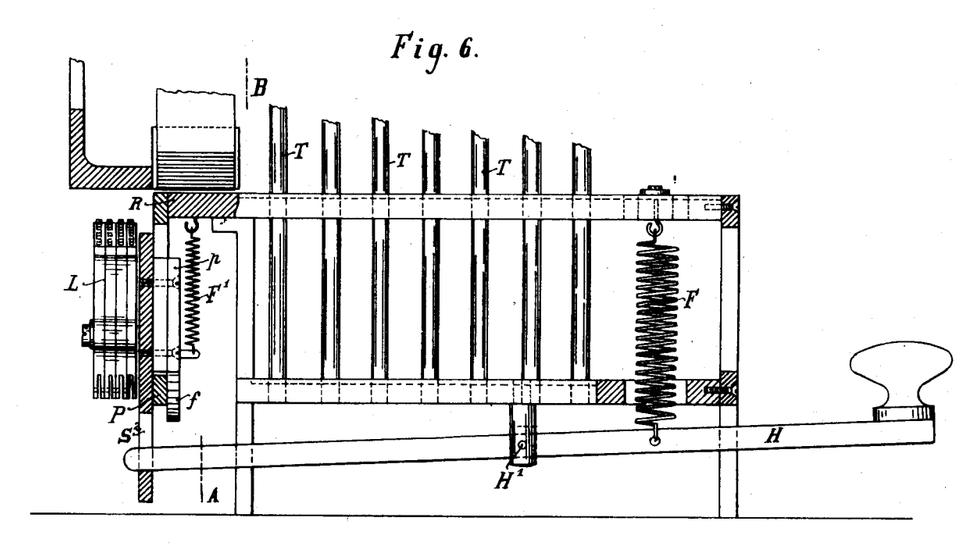
Fig. 6 is a transverse vertical section on the line $x^2\ x^2$, Fig. 1.
Figure 7:
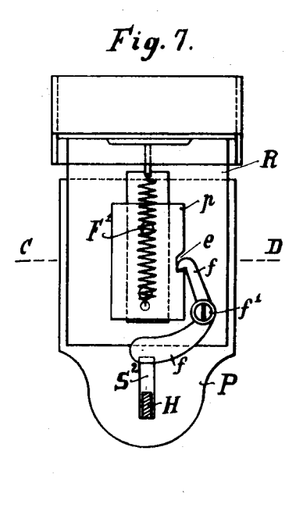
Fig. 7 is a section on the line A B, Fig. 6, illustrating the mechanism for actuating the printing device.
Figure 8:
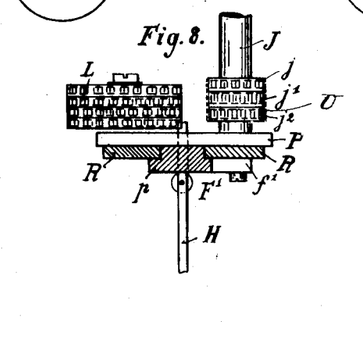
Fig. 8 is a section on the line C D, Fig. 7, showing the printing device in plan.
Figure 9:
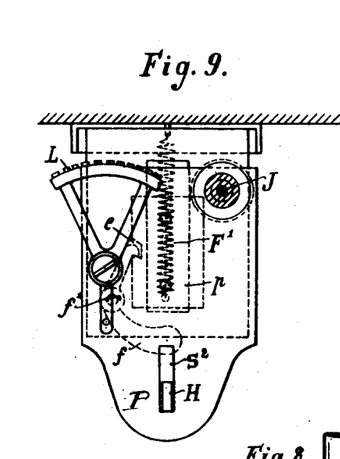
Figs. 9 and 10 show the printing device in its two positions.
Figure 10:
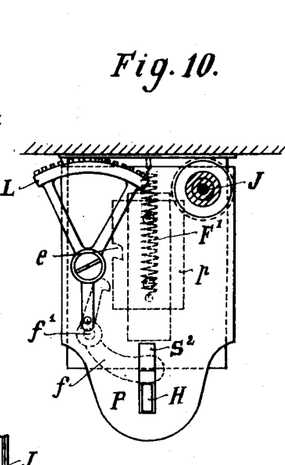
Figure 11:
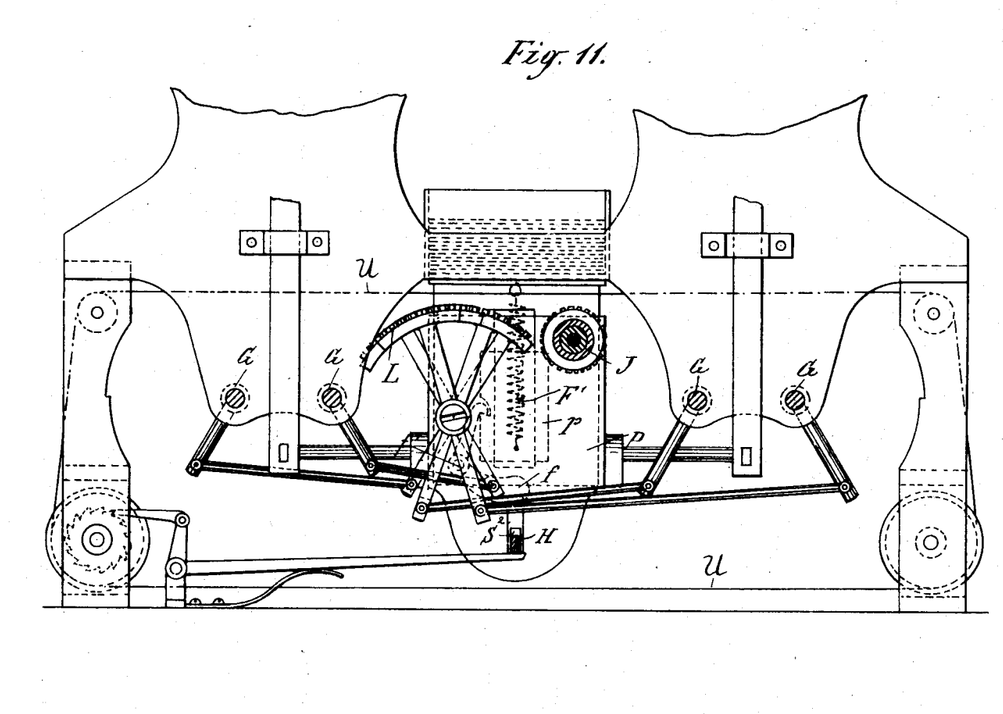
Fig. 11 is a view showing the ink-ribbon and the feeding mechanism therefor.
Figure 12:
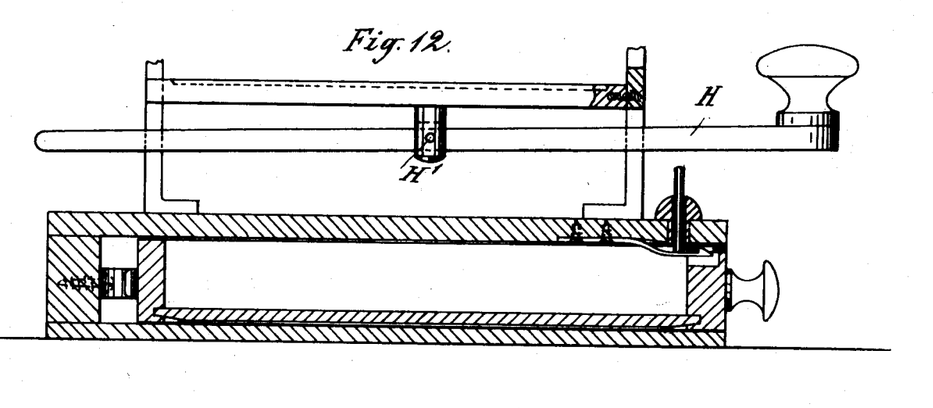
Figs. 12 and $12^a$ are detail views illustrating the cash-drawer, the opening device, and the lever II in two positions.
Figure 12A:
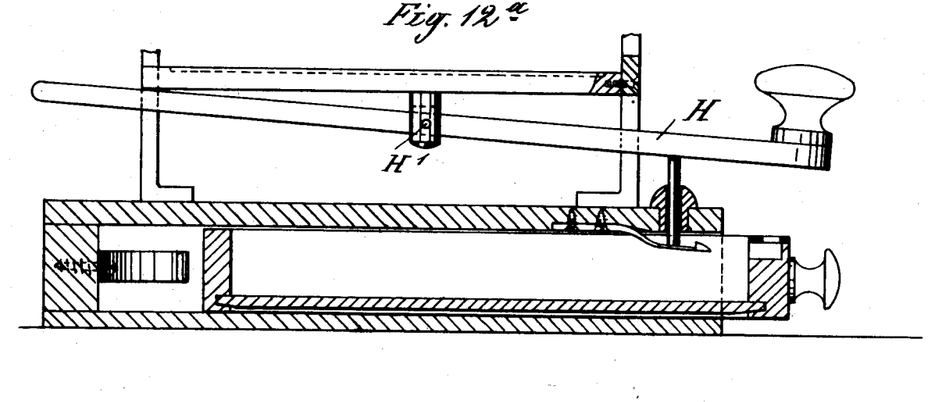

The adjustment of the numeral type-segments L of the printing device is effected by levers $m'$ $m^2$ $m^3$, which are mounted at the ends of the shafts G, Fig. 2. The type-segments L are pivotally arranged on an upwardly and downwardly movable plate P, which also bears the date-wheels $j$ $j'$ $j^2$, which are mounted on shafts J, arranged concentrically one in the other, Fig. 8. The upward and forward motion of the printing device is effected by means of a lever H, which at the same time serves for opening the cash-drawer of the check-till. This lever H, Figs. 1 and 6, is pivotally mounted at H' and is connected at its other end to the frame R of the register by means of a strong spring F. At its rear end it is guided in a slot $S^2$ in the plate P, carrying the type-segment L and the date-wheels $j$ $j'$ $j^2$. This plate P is guided in the frame R of the till, Fig. 6, and it has screwed to it a smaller plate $p$, provided with a recess $e$, in which engages a pawl $f$, pivotally mounted at $f^2$. A spring $F'$ continually tends to draw the plates $p$ and P upward against a check to be printed. These checks are stored in a holder which is arranged on the frame R of the register. The holder is provided with openings at the bottom, so that the slide S can enter and push forward the lowermost check, which thus comes over an inked ribbon U, running over rollers and guided from the printing device. The feeding motion of the ink-ribbon U is effected by means of the lever H, which is connected with a lever $H^2$, carrying a pawl $w$, which engages with ratchet-teeth on one of the guide-rollers $h^3$ of the ink-ribbon U and feeds the ink-ribbon forward at each depression of the lever H.

The method of operation of the improved check-till is as follows: If an amount is to be registered, the corresponding keys T are pressed, which thus turn the shafts G belonging thereto, and consequently the numeral-disks, through a corresponding angle, so that the purchaser can read off the amount from the disks. At the same time by reason of the rotation of the shafts G the counters $Z'$ $Z^2$ are set in action, which add the amount to the previous amount and by means of the lever $m'$ set the type-segments L of the printing device. The knob or handle of the lever H is now depressed. This causes the opening of the cash-drawer and, moreover, causes the rear end of the said lever to be pressed against the pawl $f$, which consequently turns about its pivot $f'$ and releases the plate $p$. The plates P and $p$ immediately move rapidly upward under the action of the spring $F'$, whereby the type-segments L and date-wheels are pressed against the ink-ribbon U, which is fed beneath the check, and a uniform impression is always obtained. If the knob of the lever H can be again released, the front end of the lever again moves upward under the action of the strong spring F, while its rear end presses down the plate P. As soon as the recess $e$ lies opposite the pawl $f^2$ the latter automatically reëngages therewith, and thus holds the plates P and $p$ fast again. Finally, the slide S is pressed forward, thus effecting the release of the whole mechanism of the register and the ejection of the printed check, in place of which there comes another check.

I claim—

1. In a cash-register, a series of keys provided with striking-surfaces of various heights, indicating or numeral disks, numeral type-segments, a gearing for transmitting motion to said disks and segments, a lever for operating said type-segments, means for releasing said gearing to return the whole mechanism to its normal position, and a slide provided with a wedge and adapted to engage with and operate said releasing means for the gearing.

2. In a cash-register, the combination with the lower bar of the frame thereof and keys having vertical slots, of means for limiting the downward movement of said keys, consisting of guide-holders mounted in said lower bar and adapted to receive the ends of the keys, and cross-bars mounted in said holders and adapted to extend in the slots of the keys.

3. In a cash-register, means for preventing simultaneous depression of the tens and units keys, consisting of a vertically-moving slide, ratchet-wheel segments connected with an indicator mechanism for operating the same, pawls engaging said segments to prevent the return thereof to their original positions, and a double lever connected to said slide, operated thereby and adapted to release the said pawls from their engagement with said segments.

4. In a cash-register, a gearing for operating an indicating mechanism, pawls engaging said gearing, a vertically-movable slide, a double lever operated thereby, and pins carried by said lever and adapted to engage and release said pawls from said gearing.

In testimony whereof I have hereunto set my hand in presence of two subscribing witnesses.

JOSEF HAUSER.

Witnesses:
LUDWIG BRUCH,
FRITZ MEYER.